Aug. 13, 1968     C. O. BIESER     3,396,697

CORN BUTTERING DEVICE

Filed March 1, 1965

Inventor
CARL O. BIESER,

By Jungblut, Melville, Strasser + Foster
Attorneys.

United States Patent Office 3,396,697
Patented Aug. 13, 1968

3,396,697
CORN BUTTERING DEVICE
Carl O. Bieser, 6766 Rollymeade Road,
Cincinnati, Ohio 45243
Filed Mar. 1, 1965, Ser. No. 436,226
1 Claim. (Cl. 118—76)

ABSTRACT OF THE DISCLOSURE

A corn buttering device having a receptacle to underlie an ear of corn, the receptacle having a vertical upstanding ram fixed solidly thereto. There is a sleeve which has a telescoping fit on the ram. The sleeve is designed to just nicely receive a portion, at least, of a stick of butter, the sleeve having one or more members against which the butter abuts. The top surfaces of the ram and sleeve are of a shape corresponding to an ear of corn to be received thereby. The sleeve and butter contained therein are placed over the ram. The device is such that one may place an ear of corn on the sleeve and rotate the ear while drawing it back and forth whereby the heat and weight of the corn, plus any downward pressure exerted by the user, will cause the member or members to sink into the butter and the butter to contact the corn as the ram thus pushes the butter out.

---

This invention resides in the provision of an improved corn buttering device.

Attempts have been made in the past to provide means by which one may butter corn. Some of these prior art devices have necessitated the use of melted butter. Others have required the user to use both hands. Some have been quite messy to use and difficult to clean, thus making them unsanitary.

A search of the prior art has developed the following United States Patents: 1,579,911, Berry; 2,585,174, Rosendahl; 2,730,878, Incorvaia; 2,808,020, Arvidson; 2,903,-997, Hay; Des. 194,883, Mattar.

An important object of this invention is to provide a device which utilizes butter in its solid state and by which an ear of corn may conveniently be buttered as desired.

It is a further object of the invention to provide a corn buttering device which does not result in wasted butter.

Another object of the invention is to provide a corn buttering device which is easy to use, which requires the use of only one hand and which makes possible the thorough buttering of corn to the degree desired by the user.

Yet another object of the invention is to provide a corn buttering device which is easy to clean and keep clean and, therefore, very sanitary.

A further object of the invention is to provide a corn buttering device which is attractive and which is economical to manufacture.

Figure 1:
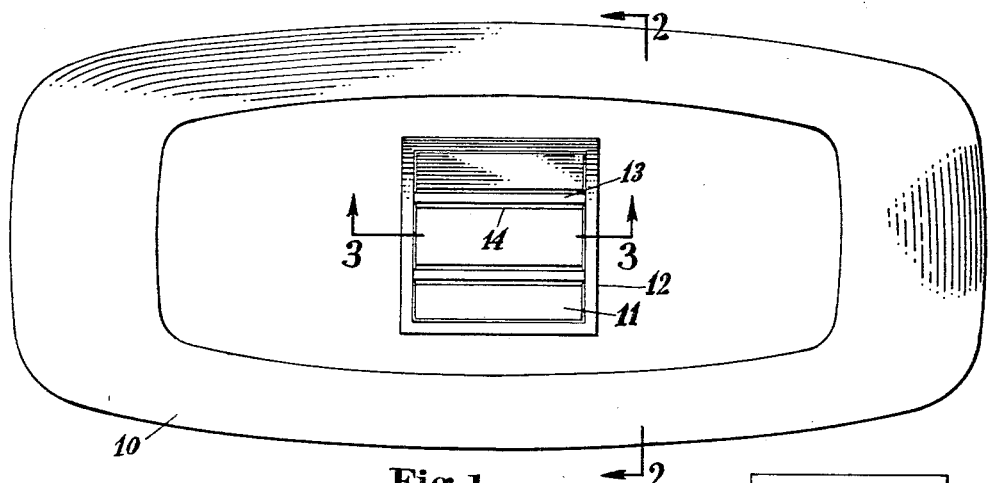
Figure 3:
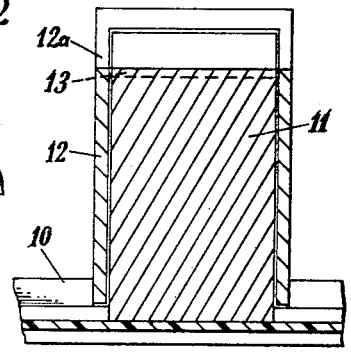
Figure 4:
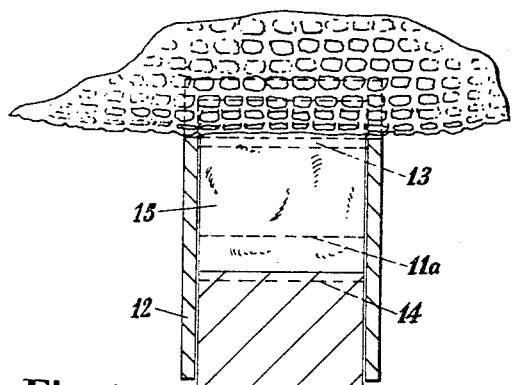
Figure 5:
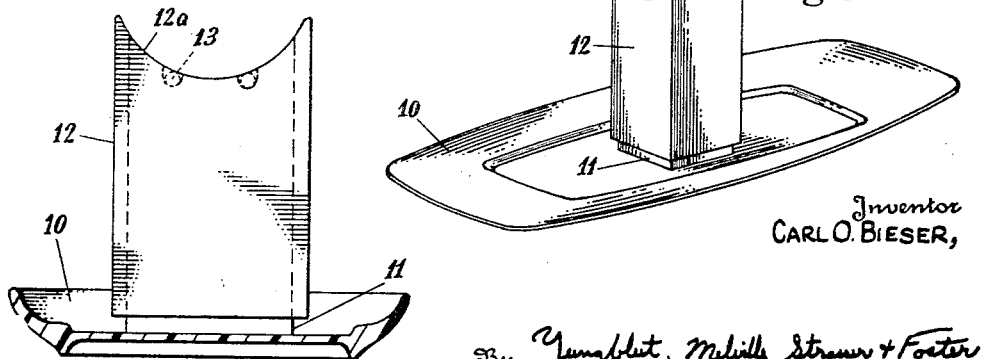
Figure 2:
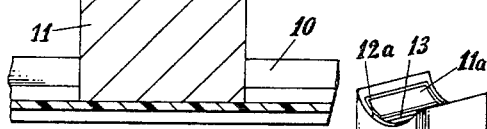

These and further objects and advantages of the invention will become apparent to the skilled worker in the art in the description to follow, keeping the foregoing remarks in mind, and with reference to the accompanying drawing, in which drawing like numerals are employed to designate like parts throughout, and in which:

FIGURE 1 is a top plan view of the invention as applied to a suitable receptacle, FIGURE 2 is a section taken on the line 2—2 of FIGURE 1, FIGURE 3 is a section taken on the line 3—3 of FIGURE 1, FIGURE 4 is a fragmentary sectional view of the invention, partly diagrammatic, illustrating the device as used to butter corn, and FIGURE 5 is a perspective view of the invention as applied to a suitable receptacle.

Referring now to the drawing, a suitable receptacle to which the invention may be applied is designated at 10. The particular receptacle illustrated is elongated and corresponds generally to the shape and dimension of an ear of corn. This is the preferred arrangement. The receptacle, however, may take other shapes and forms. Generally it is preferred that the pedestal 11 be mounted on some sort of receptacle or other base 10 so as to give stability to the whole arrangement and so that the receptacle will catch butter which may drip from the ear of corn while the invention is being used, although this may not be absolutely necessary.

The invention comprises a pedestal or ram 11, a butter sleeve 12 and a plurality of butter engaging members 13. The members 13 are depicted as bars 13 which extend across the sleeve, two being illustrated; the exact form and number may vary. The four sided sleeve 11 is open at the bottom and, except for the members 13, it is also open at the top. Two opposed side walls of the sleeve are provided with arcuate configurations 12a of a size and shape to just nicely receive an ear of corn.

Preferably the top of the pedestal or ram 11 is also arcuately configured in the same manner as the portions 12a of the sleeve. In addition grooves 14 are provided in the pedestal top to receive the bars 13 when the sleeve is in its lowermost position with respect to the pedestal 11. These grooves 14, of course, may be varied according to the number and shape of the members 13. The arcuately configured top portion of the pedestal or ram 11 is indicated at 11a. In FIGURE 4 a quantity of butter in its solid state is generally indicated at 15.

It is contemplated that the shape and size of the pedestal 11 and sleeve 12 will be such as to receive a chunk of butter cut from the conventional one quarter pound stick. It will be apparent to those skilled in the art, however, that this size and shape relationship may be adjusted to accommodate any form and quantity of butter in its solid state.

In use, a quantity of butter in its solid state may either be placed on top of the pedestal 11 or within the sleeve 12 beneath the members 13. The sleeve is then placed over the pedestal so that the butter rests on the top, concave surface of the pedestal 11 and the bars 13 rest on the butter 15. The location of the members 13 and arcuate surfaces 11a and 12a are such that the members 13 are disposed axially of the corn ear to which butter is applied. The heat of the corn and/or its weight, supplemented by any pressure the user cares to exert, will cause the butter to pass up between the members 13 sufficient to be engaged by the corn. The user will rotate the corn while moving it back and forth within the arcuate areas 11a and 12a. In this manner the desired quantity of butter may be applied uniformly to the entire ear of corn.

When one is through with the device and butter still remains, all that is necessary is to push the sleeve down about the pedestal 11 until the members 13 seat within the grooves 14 whereafter any butter that remains may simply be scraped off the top of the pedestal.

Briefly reviewed, the purpose of this device is to permit the rapid buttering of corn. The butter sleeve 12 may be removed and butter inserted from the bottom side. The sleeve, now containing solid butter, is then pressed down about the butter ram 11 to force butter out the top. The corn is rotated over the curved surface 11a and butter is thus applied. The butter is fed out by pressing the corn down on top of the butter sleeve 12. When done with the device the sleeve is pressed all the way down, seating the members 13 in the recesses 14. The butter may then be scraped off.

It will be apparent to those skilled in the art that modifications may be made in this invention without departing from the scope and spirit thereof. Also, it is to be understood that while the invention has been illustrated as embodying certain structural features and arrangements, these structural features and arrangements are not to constitute a limitation on the invention except insofar as they are specifically included in the claim which follows.

The embodiments of the invention in which an exclusive property or privilege is claimed are defined as follows:

1. A device by means of which butter may be applied to an ear of corn, said device comprising a dish-like receptacle, a vertical upstanding buttering ram mounted on and fixed to said receptacle centrally thereof, said ram being rectangular in cross-section, said receptacle being of a shape and size to underlie an ear of corn placed on said ram, and said ram having a concave arcuate top surface generally corresponding to an ear of corn; a butter sleeve having a sliding telescopic relationship with said ram, said sleeve having walls with concave arcuate notches in the top thereof corresponding to said concave arcuate top surface of said ram, the distance from the bottom of the sleeve to the bottom of the notches being less than the distance from the base of the ram to the top surface of the ram; and a member fixed within said sleeve adjacent said notches and adapted to engage butter which is placed within said sleeve on said concave arcuate top surface of said ram, the top surface of said ram having a recess to just nicely receive said member; whereby one may place an ear of corn within said concave arcuate notches and rotate said ear while drawing it back and forth through said notches, the heat and weight of said corn, plus any downward pressure exerted by the user, causing said member to sink into said butter, and said butter to come into the vicinity of said notches so as to be engaged by said ear of corn for buttering same, and whereby when said member is bottomed in said recess any remaining butter may readily be scraped off said arcuate top surface of said ram.

References Cited
UNITED STATES PATENTS

| | | | |
|---|---|---|---|
| 2,458,120 | 1/1949 | Volpini | 15—555 X |
| 2,527,149 | 10/1950 | Peterson | 15—555 X |
| 2,893,032 | 7/1959 | Selmer | 15—514 |
| 3,162,884 | 12/1964 | Bordwine et al. | 15—514 |

CHARLES A. WILLMUTH, *Primary Examiner.*

R. I. SMITH, *Assistant Examiner.*